United States Patent
Barber et al.

(10) Patent No.: US 8,613,969 B2
(45) Date of Patent: Dec. 24, 2013

(54) LOW PRESSURE DEOILING OF FRIED FOOD PRODUCT

(75) Inventors: Keith Alan Barber, Frisco, TX (US); Christopher James Koh, Southlake, TX (US); Ram Pandit, Dallas, TX (US); Scott L. Sullivan, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 192 days.

(21) Appl. No.: 13/189,170

(22) Filed: Jul. 22, 2011

(65) Prior Publication Data

US 2013/0022719 A1    Jan. 24, 2013

(51) Int. Cl.
*A23L 1/01*    (2006.01)

(52) U.S. Cl.
USPC ........... 426/417; 426/438; 426/472; 426/478; 426/523

(58) Field of Classification Search
USPC ......... 426/438, 637, 465, 472, 478, 520, 808, 426/523, 417; 99/403–415
See application file for complete search history.

(56) References Cited

U.S. PATENT DOCUMENTS

| | | | |
|---|---|---|---|
| 3,239,946 A * | 3/1966 | Forkner | 34/69 |
| 3,261,694 A | 7/1966 | Forkner | |
| 3,310,881 A | 3/1967 | Fritzberg | |
| 3,314,160 A | 4/1967 | Forkner | |
| 3,335,015 A | 8/1967 | Forkner | |
| 3,396,656 A * | 8/1968 | Forkner | 99/407 |
| 3,436,229 A * | 4/1969 | Simpson | 426/438 |
| 3,914,454 A * | 10/1975 | Takatsu et al. | 426/309 |
| 4,006,260 A | 2/1977 | Webb | |
| 4,127,947 A | 12/1978 | Webb | |
| 4,566,376 A | 1/1986 | Webb | |
| 4,852,475 A | 8/1989 | Yang | |
| 4,857,347 A | 8/1989 | Webb | |
| 4,873,920 A * | 10/1989 | Yang | 99/409 |
| 4,933,199 A | 6/1990 | Neel | |
| 5,168,797 A * | 12/1992 | Wang | 99/342 |
| 5,182,982 A | 2/1993 | Hattori | |
| 5,223,137 A | 6/1993 | Hattori | |
| 5,317,964 A * | 6/1994 | Prudhomme | 99/495 |
| 5,490,453 A | 2/1996 | Mackay | |
| 5,988,051 A | 11/1999 | Hashiguchi | |
| 6,068,872 A * | 5/2000 | Hashiguchi et al. | 426/438 |
| 6,929,812 B2 | 8/2005 | Van Der Doe | |
| 2005/0160921 A1* | 7/2005 | Ono | 99/511 |
| 2005/0238770 A1 | 10/2005 | Van Der Doe | 426/438 |
| 2007/0240702 A1* | 10/2007 | Gvili | 126/369 |
| 2007/0258109 A1 | 11/2007 | Sasaki | |
| 2008/0138480 A1 | 6/2008 | Bows | |
| 2009/0005231 A1 | 1/2009 | Silvester | |
| 2009/0304878 A1 | 12/2009 | Loehn | |
| 2010/0206179 A1 | 8/2010 | Foster | |
| 2010/0258109 A1* | 10/2010 | Foster et al. | 126/299 E |

\* cited by examiner

*Primary Examiner* — Drew E Becker
(74) *Attorney, Agent, or Firm* — James R. Gourley; Colin P. Cahoon; Carstens & Cahoon, LLP

(57) ABSTRACT

Disclosed is an improved process and system for producing low oil fried food products. The process discloses frying food products at atmospheric pressure, and deoiling the fried food products using a centrifuge under vacuum pressure.

10 Claims, 2 Drawing Sheets

LOW PRESSURE DEOILING OF FRIED FOOD PRODUCT

BACKGROUND OF THE INVENTION

1. Technical Field

The present invention relates to an improved method for producing a low oil content food product. More specifically, the present invention relates to a method whereby moisture content and oil content are controlled in a combination of unit operations.

2. Description of Related Art

Conventional potato chip products are prepared by the basic steps of slicing peeled, raw potatoes, optionally water washing the slices to remove surface starch and frying the potato slices in hot oil until a moisture content of about 1% to 2% by weight is achieved. The fried slices are then salted or seasoned and packaged.

Raw potato slices normally have moisture contents from 75% to 85% by weight depending on the type of potato and the environmental growing conditions. When potato slices are fried in hot oil, the moisture present boils. This results in burst cell walls, starch gelatinization and melting, and the formation of holes and voids which allow for oil absorption into the potato slices yielding oil contents ranging from 30% to 45% by weight.

The oil content of potato chips is important for many reasons. Most important is its contribution to the overall organoleptic desirability of potato chips. However, some nutritional guidelines indicate it is desirable to maintain a low level of oil or fat in potato chips and other fried food products. Further, too high an oil content renders the chips greasy or oily and hence less desirable to consumers. On the other hand, it is possible to make chips so low in oil that they lack flavor and seem harsh in texture.

Numerous attempts have been made in the prior art to reduce the oil content in potato chips. However, past attempts at producing lower oil content chips are either expensive, use technology that requires longer than desirable deoiling dwell time, or have failed to maintain the desired organoleptical properties such as taste and texture that have become familiar to consumers of traditional potato chips having higher fat or oil contents.

Consequently, a need exists for a process that enables the production of a fried food product such as a potato chip that has lower levels of oil than a traditionally fried food product, but that retains desirable organoleptical properties similar to traditional potato chips.

SUMMARY OF THE INVENTION

The proposed invention provides an apparatus, method and system for making a fried food product having a reduced level of fat. In one aspect, a food product is fried in hot oil at a first pressure, and the fried food product is removed from the hot oil and subjected to a deoiling step that applies centripetal force to the food product at a second pressure, wherein the second pressure is lower than the first pressure. In a preferred embodiment, the frying step occurs at atmospheric pressure, and the centrifugation step occurs at pressures below atmospheric.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
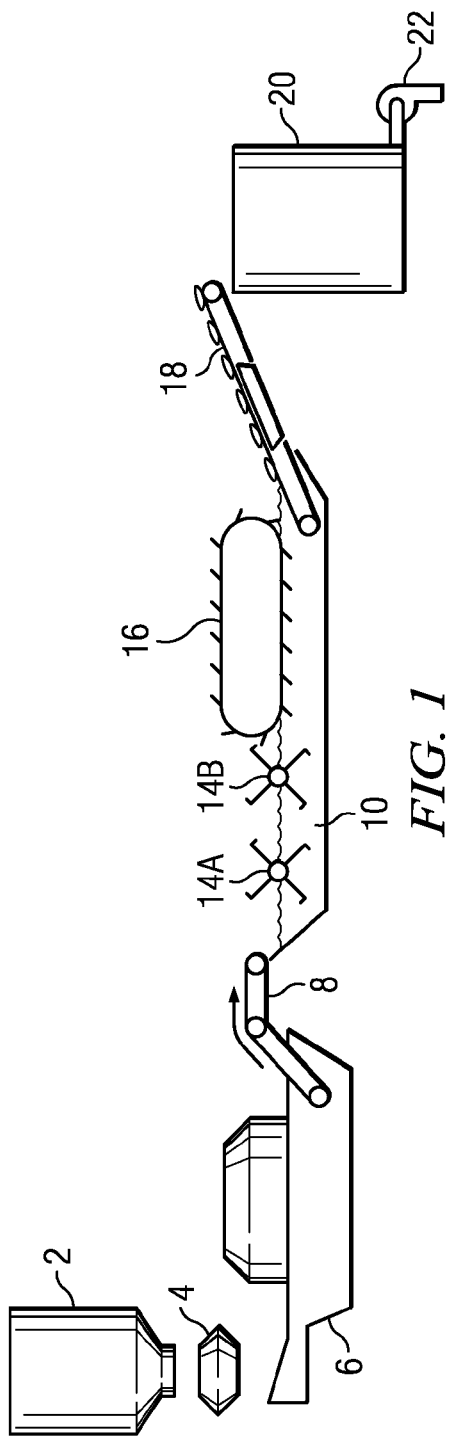
FIG. 1 is a schematic representation of one embodiment of an apparatus that can be used to practice the method of this invention.

An embodiment of the innovative invention will now be described with reference to a potato chip making system and process depicted in FIG. 1. However, the present invention, in its broadest respect, can be applied to a wide variety of fried food products, as described in detail below.

Whole potatoes stored in hopper 2 are dispensed into a slicing apparatus 4 which drops potato slices into a water wash 6. The wash step is optional.

In a preferred embodiment, the frying oil entering the fryer is maintained at an initial temperature between about 320° F. to about 380° F. more preferably between about 335° F. and about 370° F. Any conventional frying medium can be used in accordance with various embodiments of the present invention, including frying mediums with digestible and/or non-digestible oils. In one embodiment, the fryer is a continuous single flow or multizone fryer which utilizes devices such as paddle wheels, 14A and 14B, and a submergible conveyor belt 16 to control the flow of potato slices through the fryer 10. Although this embodiment of the invention uses a continuous fryer, batch, semi-batch or semi-continuous fryers may also be utilized in accordance with the present invention.

Because the present invention can be applicable to foods other than sliced potatoes, the aspects of the invention involving frying and post-frying processing may now be described generally as pertaining to food pieces. Food pieces can include whole or pieces of a variety of fruits and vegetables. Food pieces can also include fabricated chip products such as fabricated potato chips and tortilla chips. Food pieces may also include extruded (optionally direct expanded) collets made from corn meal or other starchy ingredients.

Once the potato slices or food pieces have been fried to their final moisture content, the food pieces are removed from the fryer, preferably by a perforated endless belt conveyor 18. If the fryer is a batch fryer, the food pieces may be removed by a basket or other appropriate means (not shown). In one embodiment, the frying oil in the vicinity of the perforated endless belt conveyor 18 comprises a final temperature of between about 290° F. to about 410° F. and more preferably between about 295° F. to about 320° F. For potato slices that have been completely fried, the final moisture content is typically less than about 2% by weight.

In one embodiment, the food pieces exit the fryer comprising an oil content of between about 30% and about 40% by weight. Potato slices that are not washed prior to frying typically exit the fryer with a lower oil content than slices that are washed before frying.

Upon exiting the fryer, surface oil on the fried food piece can be absorbed into the fried food piece if the fried food piece is permitted to cool. Because the gaseous temperature above the frying oil medium and above the take-out conveyor is not as hot as the oil temperature, merely exiting the frying oil medium can cause the fried food piece to cool. Analysis of cross-sections of fried potato slices using micro-CT scanning and other magnification techniques shows that some oil is absorbed into ruptured interior cells and fissures of the potato slice and some oil remains on the outer surface of the potato slice.

As shown in FIG. 1, the fried potato slices are then transferred to a deoiling step that uses centripetal force to remove oil from the potato slices, which in a preferred embodiment, is accomplished by the use of a vacuum centrifuge 20. Either or both of the removing and transferring steps may be heated. Maintaining a high temperature during these steps facilitates dehydration and oil removal, as described more fully below.

Figure 2:
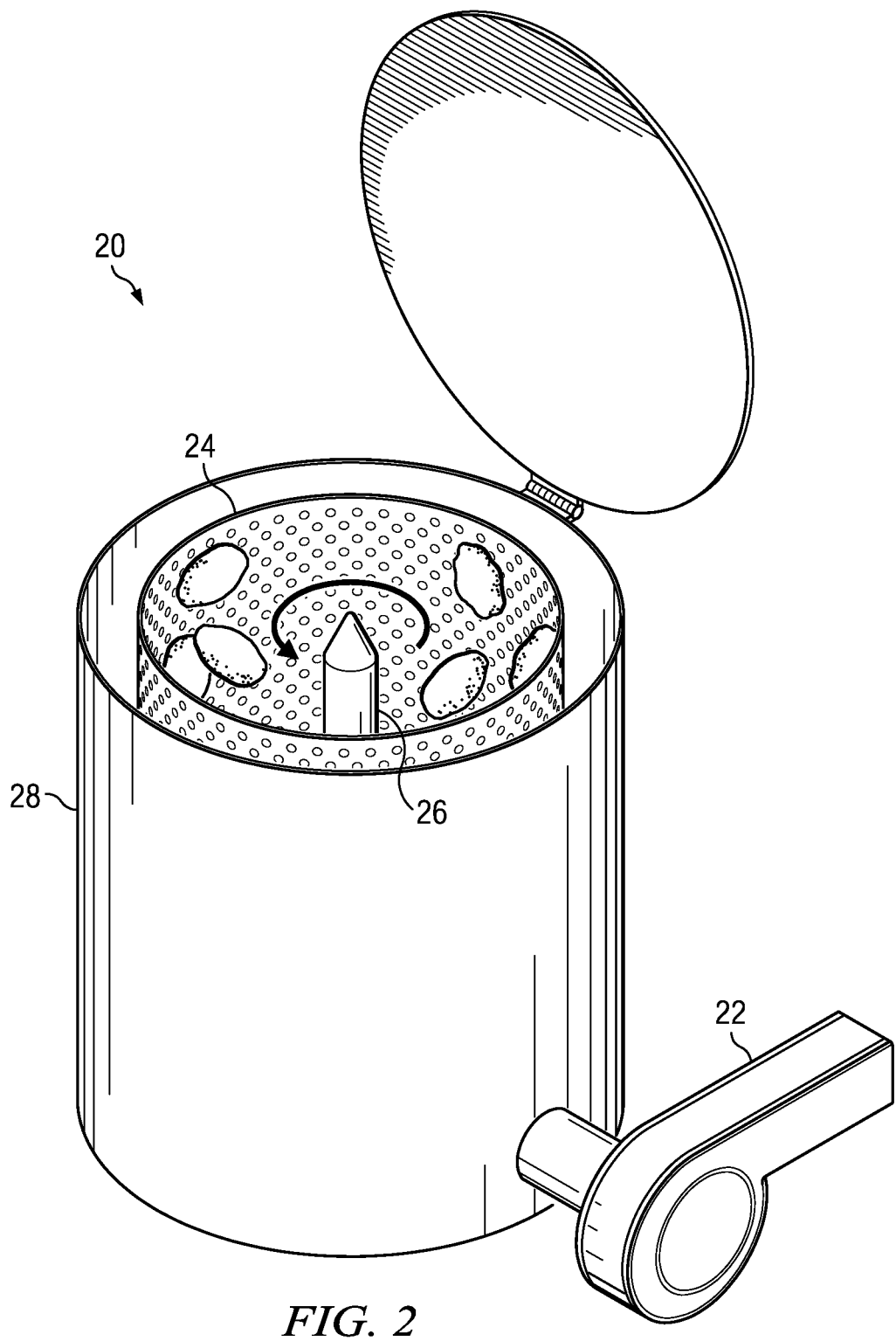
FIG. 2 is a perspective view of a vacuum centrifuge that can be used in accordance with one embodiment of the present invention.

FIG. 2 depicts one embodiment of a centrifuge 20 that can be used in accordance with the present invention. The centrifuge 20 comprises a basket 24 with a perforated outer wall, which is attached to a central axle 26. A motor (not shown) spins the central axle 26, which causes potato chips loaded in the basket 24 to be thrown in a radial direction towards the outer wall of the basket. The centripetal force being exerted on the potato chips by the outer wall of the perforated basket 24 retains the potato chips and allows oil on the surface of the potato chips to be stripped off and pass through the perforations in the basket. Thus, the fried food products are deoiled by centripetal force. In a preferred embodiment, the fried food products are loaded in close proximity to the perforated outer wall of the centrifuge basket. When food products are loaded near the outer wall of the basket, product movement and consequent breakage during centrifugation is minimized.

In one embodiment, the centrifuge basket also comprises an inner wall (not shown), and the distance between the inner wall and the outer wall is between one and three times the average major diameter of the food product being deoiled. The major diameter of a food product is the length of the longest line that can be drawn between two points located on the surface of the food product. For potato chips, the annulus should be between about 2 and 4 inches wide. Such an annulus will maintain the force each potato chip exerts on the other potato chips in the product bed below a threshold that produces unacceptable levels of product breakage.

In another embodiment, the centrifuge comprises multiple inner and perforated outer walls, wherein the space between each inner and outer wall comprises an annulus. In a preferred embodiment, the distance between each inner and outer wall is between one and three times the average major diameter of the food product being deoiled, though each distance need not be equal to the others. Each outer wall should preferably have perforations that direct removed oil away from annuli which are further away from the central hub. In one embodiment, the perforations direct the oil from an inner annulus to an area below the centrifuge basket. A centrifuge basket with multiple annuli increases the capacity of the vacuum centrifuge without causing an increase in product breakage.

Another key feature of the centrifuge depicted in FIG. 2 is the vacuum system 22 that lowers the pressure inside the vessel 28 containing the perforated basket 24 and axle 26. The vessel containing the perforated basket must be substantially air tight and capable of holding a vacuum. Applicants herein have found that when food pieces have been fried at atmospheric pressure and then subjected to a low pressure centrifugation step, the oil content of the fried food pieces is dramatically and surprisingly lower than when an atmospheric centrifugation step is used. Without being limited by theory, Applicants believe that the vacuum draws oil out from the interior spaces of the potato slices to the surface, thereby allowing the centripetal force exerted on the slices by the centrifuge to remove it from the surface of the potato slices. Additionally, the vacuum maintains a positive pressure differential between the internal spaces of the potato slice to the outside, which resists further oil absorption during the centrifugation step. Furthermore, the deoiled food pieces have a mouthfeel and other organoleptic properties similar to food pieces that have not been deoiled under vacuum conditions because oil that was previously trapped inside the fried food piece is drawn to the surface, so that a large portion of the oil remaining with the food piece after deoiling is immediately available to be detected when the food piece is consumed. In a preferred embodiment, the vacuum system is capable of quickly evacuating the centrifuge chamber so that product throughput and oil removal is maximized. This can be accomplished by one or both of reducing the amount of non-product space in the centrifuge or using a large vacuum pumping system. Rapid depressurization of the centrifuge chamber can also quickly convert water remaining in the food product into steam, which expels oil from the interior of the food product to the outer surface.

In one embodiment, the vacuum centrifuge step is a batch step. In a preferred embodiment, the vacuum centrifuge is a continuous or semi-continuous centrifuge, with product loading and unloading zones that allow the centrifuge to maintain a vacuum while food pieces are transferred into and out of the centrifuge. In one embodiment, the centrifuge step occurs in multiple stages, where the food products inside the vacuum centrifuge are deoiled for a first period of time, the products are stirred, and then the products are deoiled for a second period of time. The products may be stirred by vibrating or agitating the centrifuge basket, by slowly rotating the centrifuge basket so the products are not pinned against the outer wall but instead are able to shift position, or by a member that extends into the basket and physically stirs the food products. The products may also be stirred by transferring them from one vacuum centrifuge to another. The stirring step reorients the food products inside the centrifuge basket prior to the second centrifuge stage, allowing for more uniform deoiling of the food products.

In another embodiment, the potato slices are par-fried in the fryer to a moisture content above about 2% by weight, and dehydrated to a final moisture content of less than 2% by weight inside the vacuum centrifuge. In a preferred embodiment when the food products require further dehydration inside the vacuum centrifuge, the interior of the vacuum centrifuge is heated. The heating may be provided by an electromagnetic source, such as a microwave (MW) source, an infrared (IR) heating source or a radio frequency (RF) heating source. RF heating has been shown to provide selective heating of water, even at lower moisture contents, which makes it ideal for heating the low moisture food products inside the vacuum centrifuge. Also, whereas convection heating requires an environment with a heat capacity inside the centrifuge to function well, electromagnetic heat sources work well under vacuum conditions. Heating the food products inside the vacuum centrifuge not only helps with final dehydration of the food products, but it also helps with oil removal by increasing the temperature, and therefore, reducing the viscosity of the oil on the food pieces. Less viscous oil is more readily removed from the open cells and fissures due to the pressure change, and from the surface when centrifugal force is applied to the food pieces. Heating the centrifuge has also shown positive results when the product enters the centrifuge at its final moisture content.

The specific conditions under which the vacuum centrifugation step occurs can be determined by one skilled in the art without undue experimentation, upon reading this specification. However, Applicants have found that several important factors determine the level of oil removed from the potato slices.

The difference in pressure between the fryer and the vacuum centrifuge is an important process variable. Generally, a larger pressure differential between the fryer and the centrifuge will result in more oil removal from potato slices, and pressure has a very significant influence on oil removal in comparison with the other factors. In one embodiment, the pressure inside the vacuum centrifuge reaches a pressure that is at least about 15 in Hg below atmospheric pressure (−15 in Hg gauge or −50.8 kPa). When all other process variables are unchanged, the final oil content of the food product can be controlled by adjusting the pressure inside the vacuum centrifuge. When atmospheric frying is used, maximum oil reduction is achieved when the pressure inside the vacuum centrifuge is less than 28 in Hg below atmospheric (−28 in Hg gauge or about −95 kPa).

The amount of time the food pieces are spun inside the vacuum centrifuge can also influence the amount of oil removal. The exact dwell time of the food pieces will depend on other process variables. At longer dwell times a practitioner of the present invention will reach a point of severely diminishing returns and eventually a point at which maximum oil removal has occurred. Furthermore, higher dwell times have a negative effect on the capacity of the unit operation. Applicants herein have determined that the point of diminishing returns is reached in fried potato slices after about 15-60 seconds of dwell time, and more preferably after about 30 seconds. In one embodiment, the food pieces have a dwell time inside the vacuum centrifuge of at least about 15 seconds, or more preferably, at least about 30 seconds.

Applicants have also found that the amount of centripetal force applied to the food pieces also affects the level of oil removal during vacuum centrifugation. For a given basket configuration, the centripetal force applied to the fried food products is generally determined by the angular speed at which the basket is rotated. Depending on product load, the centripetal force has an upper commercially acceptable limit that occurs when the food products experience significant product breakage. In one embodiment, the upper threshold for centripetal force occurs when the potato chips exiting the vacuum centrifuge comprise at least about 20% broken potato chips. Applicants have found this has occurred for unwashed, batch kettle fried potato chips at about 200 Gs for lightly loaded baskets, and for washed, continuous fried potato chips at about 120 Gs for lightly loaded baskets.

Still another important factor in the level of oil removed from fried food pieces is the lag time between when the products exit the fryer, and when they enter the vacuum centrifuge step. Applicants theorize that the longer the food pieces are allowed to cool, more oil is absorbed into the interior cells. This might occur because water initially present in a vapor state in the interior cells, which can repel oil absorption while in the vapor state, condenses as the product cools, thereby allowing oil to penetrate into the cells. Regardless of theory, Applicants have found that a shorter lag time between the fryer exit and the vacuum centrifuge step results in more oil removal.

Finally, the temperature of the food pieces, oil and surfaces inside the vacuum centrifuge has a significant influence on the oil removal process. As stated previously, when oil is heated, its viscosity is reduced, allowing it to drain more effectively. Also, at vacuum pressures, even modest heating inside the vacuum centrifuge can keep the water in the vapor state, further dehydrating the food pieces and resisting oil penetration.

Figure 3:
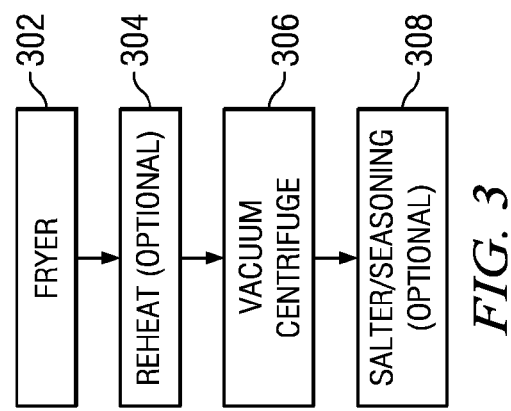
FIG. 3 is a flow chart illustrating the method steps in one embodiment of the present invention.

FIG. 3 depicts the steps of one embodiment of the present invention. Food pieces are fried in a fryer 302, optionally heated 304, and then subjected to a vacuum centrifuge step 306 for deoiling. The deoiled food products can then optionally be salted or seasoned 308, and sent to be packaged or sold.

EXAMPLES

In one set of experiments, potato slices were subjected to an atmospheric frying step followed by a centrifugation step that also occurred under atmospheric pressure conditions. When the potato slices were unwashed and kettle cooked, the average oil content of the slices entering the centrifuge was 36.4%, and the average oil content of the slices exiting the centrifuge was 29.1%, or an average oil reduction of 7.3% by weight of the fried potato slices. When the potato slices were washed and subjected to a continuous frying step, the average oil content of the slices entering the centrifuge was 37.3%, and the average oil content of the slices exiting the centrifuge was 35.6%, or an average oil reduction of 1.8% by weight of the fried potato slices. The centrifuge used in these trials was a commercially available centrifuge with no vacuum capability. It is believed that the loose starch present on the surface of unwashed kettle cooked chips, when fried, forms a crust that prevents oil migration to the interior of the chip, leaving most of the oil present in the chip on the surface, which is why the atmospheric centrifugation step benefited the unwashed kettle cooked chips more than the washed chips.

Applicants herein conducted a second set of trials on a Robatel model RC-40 centrifuge, which Applicants modified to include a vacuum system capable of reducing the pressure inside the centrifuge chamber to about 29 in Hg below atmospheric (a vacuum pressure of 29 in Hg gauge (−98.21 kPa), or an absolute pressure of about 0.9 in Hg)

When the potato slices were unwashed and kettle cooked, the average oil content of the slices entering the centrifuge was 34.9%, and the average oil content of the slices exiting the centrifuge was 18.1%, or an average oil reduction of 16.8% by weight of the potato chips. The oil reduction can also be characterized as about a 48% reduction in the amount of oil remaining on the potato chips. When the potato slices were washed and subjected to a continuous frying step, the average oil content of the slices entering the centrifuge was 36.0%, and the average oil content of the slices exiting the centrifuge was 24.6%, or an average oil reduction of 11.4% by weight of the potato chips. The oil reduction can also be characterized as about a 54% reduction in the amount of oil remaining on the potato chips.

In sum, when vacuum was used to centrifugally deoil unwashed kettle fried potato chips, the percent of oil removed improved from 7.3% to 16.8%, and when vacuum was used to centrifugally deoil washed and fried potato chips, the percent oil removal improved from 1.8% to 11.4%. Applicants have thus demonstrated that applying a vacuum to a deoiling centrifuge surprisingly and substantially increases the amount of oil that is removed by the centrifuge.

Applicants also tested the effect of lag time between the frying step and the vacuum centrifuge step on the oil content of potato chips. Washed and continuously fried potato slices were subjected to lag times of 15 seconds, 120 seconds, and 240 seconds, which resulted in an average oil content of about 25%, about 28%, and about 31%, respectively.

Applicants also tested the effect of dwell time inside the vacuum centrifuge on the final oil content of the fried potato chips. Unwashed kettle fried slices were subjected to vacuum centrifugation for 15 seconds, 30 seconds, 60 seconds, and 120 seconds, which resulted in an average oil content of about 19%, about 18%, about 17% and about 17%, respectively.

Applicants also tested the effect of pressure inside the vacuum centrifuge on the final oil content of the fried potato chips. Unwashed kettle fried slices were centrifuged at atmospheric pressure, −12 in Hg gauge (−40.64 kPa), and −29 in Hg gauge (−98.21 kPa), which resulted in final oil contents of about 24%, about 22%, and about 15%, respectively. Washed and fried potato slices were centrifuged at atmospheric pressure, −12 in Hg gauge (−40.64 kPa), −24 in Hg gauge (−81.27 kPa) and −29 in Hg gauge (−98.21 kPa), which resulted in final oil contents of about 38%, about 36%, about 30%, and about 26%, respectively.

Applicants also tested the vacuum centrifuge deoiling step on extruded, direct expanded collets made from corn meal and other ingredients, which had been fried in hot oil. When no vacuum was used, essentially no oil was removed from the fried collets. However, when vacuum was applied during the centrifugal deoiling step, the average percent oil removal was 4.2%.

It is important to note that the oil contents of the potato chips in the examples described above are not necessarily indicative of the oil contents of commercially available potato chips, or potato chips described in the prior art. The specific equipment and processing conditions also have an effect on oil content. The present invention provides a method and system for dramatically reducing the oil content of fried food products below where it would be if produced on identical equipment under identical conditions but without the vacuum centrifuge step.

Applicants have thus demonstrated that a pressure differential between the frying step and the centrifuge deoiling step produces surprisingly low oil fried food products. When the frying and centrifuge deoiling step both occur at atmospheric pressure, a small amount of oil was removed from the potato chips, especially when the slices are washed and fried. Applicants expect that the same result would occur when potato slices are both fried and centrifugally deoiled under vacuum conditions—no pressure differential would exist to draw oil from the interior of the food products to the outer surface where it can be mechanically removed. The present invention in its broadest sense involves conducting the centrifugal deoiling step at a pressure that is lower than the frying step. In one embodiment, the present invention comprises frying at pressures above atmospheric and then centrifugally deoiling at atmospheric pressure or below. In another embodiment, the present invention comprises frying at atmospheric pressure and then centrifugally deoiling under vacuum conditions.

One embodiment of the present invention is a method of producing a low oil fried food product comprising the steps of flying a food product to produce a fried food product, removing said food product from said hot oil, and deoiling said fried food product by centripetal force at a second pressure, wherein said second pressure is lower than said first pressure.

In one embodiment, the difference between the first pressure and the second pressure is at least 15 in Hg (50.8 kPa). In a preferred embodiment, the first pressure is atmospheric pressure, and the second pressure is below atmospheric pressure. In a more preferred embodiment, the second pressure is at least 15 in Hg below atmospheric pressure (−15 in Hg gauge or −50.8 kPa). In another embodiment, the first pressure is below atmospheric pressure, and the second pressure is further below atmospheric pressure. One embodiment of the present invention comprises the step of controlling the final oil content of the food pieces by controlling the second pressure.

In another embodiment of the present invention, the difference between the oil content of the food products after the frying step and the oil content of the food products after the deoiling step is at least 10% by weight of the fried food products. In a preferred embodiment, the difference between the oil content of the food products after the frying step and the oil content of the food products after the deoiling step is at least 15% by weight of the fried food products.

While some embodiments of the present invention are directed towards a potato slice embodiment, other embodiments can be used in accordance with the spirit and scope of the present invention. Consequently, where potato slices are referred to herein, Applicants mean to include any sliced (regardless of thickness), cut or whole fruit or vegetable pieces which can be fried. Further, the present invention can also be applied to dough-based embodiments and fabricated food products including, but not limited to, corn chips and tortilla chips. For example, a corn chip or a tortilla chip exiting an atmospheric fryer can be subjected to a vacuum centrifuge deoiling step with improved results over the prior art. The present invention can also be applied to extruded food pieces which are fried after extrusion. The present invention may also be applied to other fried food pieces, such as pieces of meat, nuts and legumes.

While this invention has been particularly shown and described with preferred embodiment, it will be understood by those skilled in the art that various changes and form detail may be made therein without departing from the spirit and scope of the invention.

What is claimed is:

1. A method for producing a low oil fried food product, said method comprising the steps of:
   frying a food product in hot oil at a first pressure to produce a fried food product;
   removing said fried food product from said hot oil;
   transferring said fried food product from a fryer to a centrifuge, wherein said centrifuge comprises a basket with a perforated outer wall;
   heating said fried food product during said transferring;
   deoiling said fried food product by applying centripetal force to said food product at a second pressure, wherein said second pressure is less than said first pressure, wherein said deoiling step comprises at least two centrifugal stages, wherein said fried food products are stirred between said stages; and
   heating said fried food product during said deoiling step.

2. The method of claim 1 wherein said first pressure is about atmospheric pressure.

3. The method of claim 1 wherein said second pressure is at least about 50.8 kPa lower than said first pressure.

4. The method of claim 1 further comprising loading said centrifuge basket with said fried food product in close proximity to said outer wall.

5. The method of claim 1 wherein said food product comprises a plurality of food products.

6. The method of claim 1 wherein said first pressure is below atmospheric pressure.

7. The method of claim 1 wherein said fried food product after said frying step comprises a first oil content, and wherein said fried food product after said deoiling step comprises a second oil content, wherein said second oil content is at least 10% by weight of said food product lower than said first oil content.

8. The method of claim 1 wherein said fried food product after said frying step comprises a par-fried food product having an intermediate moisture content greater than 2% by weight, and said deoiling step further dehydrates said par-fried food product to a final moisture content of less than 2% by weight.

9. The method of claim 1 wherein said heating step uses a microwave heating source or radio frequency heating source.

10. The method of claim 1 wherein said food product comprises a final oil content after said deoiling step, and further comprising controlling said final oil content by controlling said second pressure.

* * * * *